United States Patent
Yamamoto

(10) Patent No.: US 11,947,337 B2
(45) Date of Patent: Apr. 2, 2024

(54) DEVICE FOR MACHINE TOOL

(71) Applicant: DMG MORI CO., LTD., Nara (JP)

(72) Inventor: Kazuyuki Yamamoto, Sapporo (JP)

(73) Assignee: DMG MORI CO., LTD., Nara (JP)

( * ) Notice: Subject to any disclaimer, the term of this patent is extended or adjusted under 35 U.S.C. 154(b) by 522 days.

(21) Appl. No.: 17/379,967

(22) Filed: Jul. 19, 2021

(65) Prior Publication Data

US 2022/0026878 A1  Jan. 27, 2022

(30) Foreign Application Priority Data

Jul. 21, 2020 (JP) ................. 2020-124720

(51) Int. Cl.
| | |
|---|---|
| *G05B 19/414* | (2006.01) |
| *H04N 7/18* | (2006.01) |
| *H04N 23/57* | (2023.01) |
| *H04N 23/65* | (2023.01) |
| *H04W 52/02* | (2009.01) |

(52) U.S. Cl.
CPC .......... *G05B 19/414* (2013.01); *H04N 7/183* (2013.01); *H04N 23/57* (2023.01); *H04N 23/651* (2023.01); *H04W 52/0251* (2013.01); *G05B 2219/34073* (2013.01); *G05B 2219/34315* (2013.01)

(58) Field of Classification Search
None
See application file for complete search history.

(56) References Cited

U.S. PATENT DOCUMENTS

| | | | |
|---|---|---|---|
| 2010/0238977 A1* | 9/2010 | Bulled | H04W 52/0229 |
| | | | 375/136 |
| 2019/0375066 A1 | 12/2019 | Suzuki et al. | |
| 2020/0003552 A1* | 1/2020 | Yamada | G01B 11/24 |

FOREIGN PATENT DOCUMENTS

| | | |
|---|---|---|
| JP | 2017146805 A | 8/2017 |
| JP | 2018-087749 A | 6/2018 |
| JP | 2018-103286 A | 7/2018 |

* cited by examiner

*Primary Examiner* — Sean Shechtman
(74) *Attorney, Agent, or Firm* — IP Business Solutions, LLC

(57) ABSTRACT

A device for a machine tool, which is detachable from an attachment part of the machine tool, includes: a data generating unit that generates data; a first communication unit that transmits the data generated by the data generating unit to an information processing device; a first control unit that activates and controls the first communication unit; a power receiving unit that receives power supplied from outside and transmits the power to the first control unit; a second communication unit capable of constantly communicating with the information processing device; a battery that supplies power to the second communication unit; and a second control unit that supplies power from the battery to the first control unit to activate the first control unit when the second communication unit has received an activation command from the information processing device.

4 Claims, 5 Drawing Sheets

DEVICE FOR MACHINE TOOL

CLAIM OF PRIORITY

This application claims priority to Japanese Patent Application No. 2020-124720 filed on Jul. 21, 2020, which is incorporated herein by reference.

BACKGROUND OF INVENTION

1. Field

The present invention relates to a device for a machine tool.

2. Description of Related Art

In this technical field, Patent Literature 1 teaches a sensor head 10 constituted by a body 12 and a collet chuck 18, in which a leading end of the body 12 includes a light emitting window 14 for irradiating a workpiece W with laser light L emitted by a non-contact sensor included in the sensor head 10, and a light receiving window 16 for receiving laser light (reflected light) R reflected by the surface of the workpiece W, and the collet chuck 18 having the same shape as each of collet chucks of tools accommodated in a tool magazine of a machining center is attached to a back end of the body 12. The sensor head 10 includes a secondary battery 106, and a wireless LAN unit 102, and transmits measurement data including measurement information on the distance to the workpiece W through radio communication.

RELATED ART LIST

Patent Literature 1: JP 2018-087749 A

With the technology described in Patent Literature 1, however, "vibration" triggers recovery from a sleep state, which makes the mechanism complicated and recovery in response to erroneous operation be likely to occur. There may thus be cases where the remaining charge of the secondary battery 106 is too small for recovery from the sleep state. If the secondary battery 106 is increased in size, however, the sensor head itself is also increased in size.

SUMMARY OF INVENTION

A device according to the present invention is therefore a device for a machine tool, detachable from an attachment part of the machine tool, including:
  a data generating unit that generates data;
  a first communication unit that transmits the data generated by the data generating unit to an information processing device;
  a first control unit that activates and controls the first communication unit;
  a power receiving unit that receives power supplied from outside and transmits the power to the first control unit;
  a second communication unit capable of constantly communicating with the information processing device;
  a battery that supplies power to the second communication unit; and
  a second control unit that supplies power to the first control unit to activate the first control unit when the second communication unit has received an activation command from the information processing device.

According to the present invention, a battery can be reduced in size or in capacity in a device for a machine tool, which is detachable from an attachment part of the machine tool and capable of transmitting data.

DETAILED DESCRIPTION

Embodiments of the present invention will be illustratively described in detail below with reference to the drawings. Components described in the embodiments below, however, are just examples, and are not intended to limit the technical scope of the present invention.

First Embodiment

A device 100 for a machine tool according to a first embodiment will be described with reference to FIG. 1. The device 100 for a machine tool is a device that can be attached to and detached from a machine tool device attachment part 111 of a machine tool 110 (hereinafter simply referred to as an attachment part 111).

Examples of the device 100 for a machine tool include a camera, a measurement device, a laser scanner, an intelligent tool including a sensor for sensing vibration, temperature, or the like, and a light source of laser or the like.

Examples of the machine tool device attachment part 111 include a spindle of the machine tool, a pot of a magazine, a turret, a cover fixing part of a machine tool, and a fixing part on a side wall of a machine tool, serving as a tool attachment part.

Figure 1:
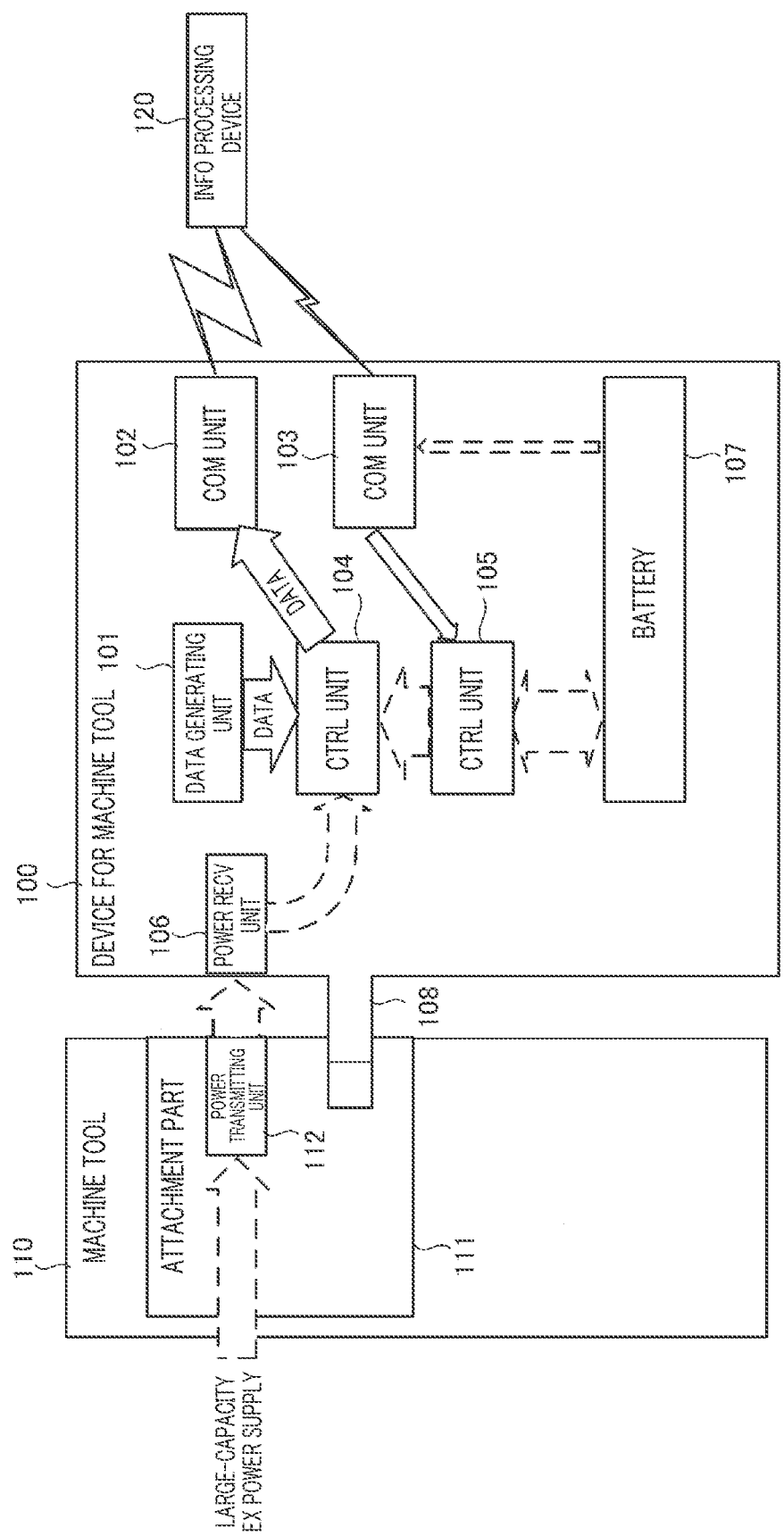
FIG. 1 is a block diagram illustrating a configuration of a device for a machine tool according to a first embodiment.

As illustrated in FIG. 1, the device 100 for a machine tool includes a data generating unit 101, communication units 102 and 103, control units 104 and 105, a power receiving unit 106, and a battery 107.

The data generating unit 101 is a unit that generates data. The communication unit 102 transmits data generated by the data generating unit 101 to an information processing device 120.

The control unit 104 activates and controls the communication unit 102. The power receiving unit 106 transmits power supplied from outside to the control unit 104. The communication unit 103 constantly communicates with the information processing device 120. The battery 107 supplies stored power to the communication unit 103.

When the communication unit 103 has received an activation command from the information processing device 120, the control unit 105 supplies power to the control unit 104 to activate the control unit 104.

The power supplied to the control unit 104 may be supplied from the battery 107, or may be supplied from another battery. Alternatively, the power may be supplied from outside through wireless power transmission.

According to the configuration of the present embodiment, reception of an activation command via the communication unit 103, which is capable of constant communication, triggers activation of the control unit 104, and can also trigger activation of the communication unit 102, which enables transmission of data to the information processing device 120 by using the device 100 for a machine tool immediately after an attachment part 108 of the device 100 for a machine tool is attached to the attachment part 111 of the machine tool 110.

Second Embodiment

Figure 2:
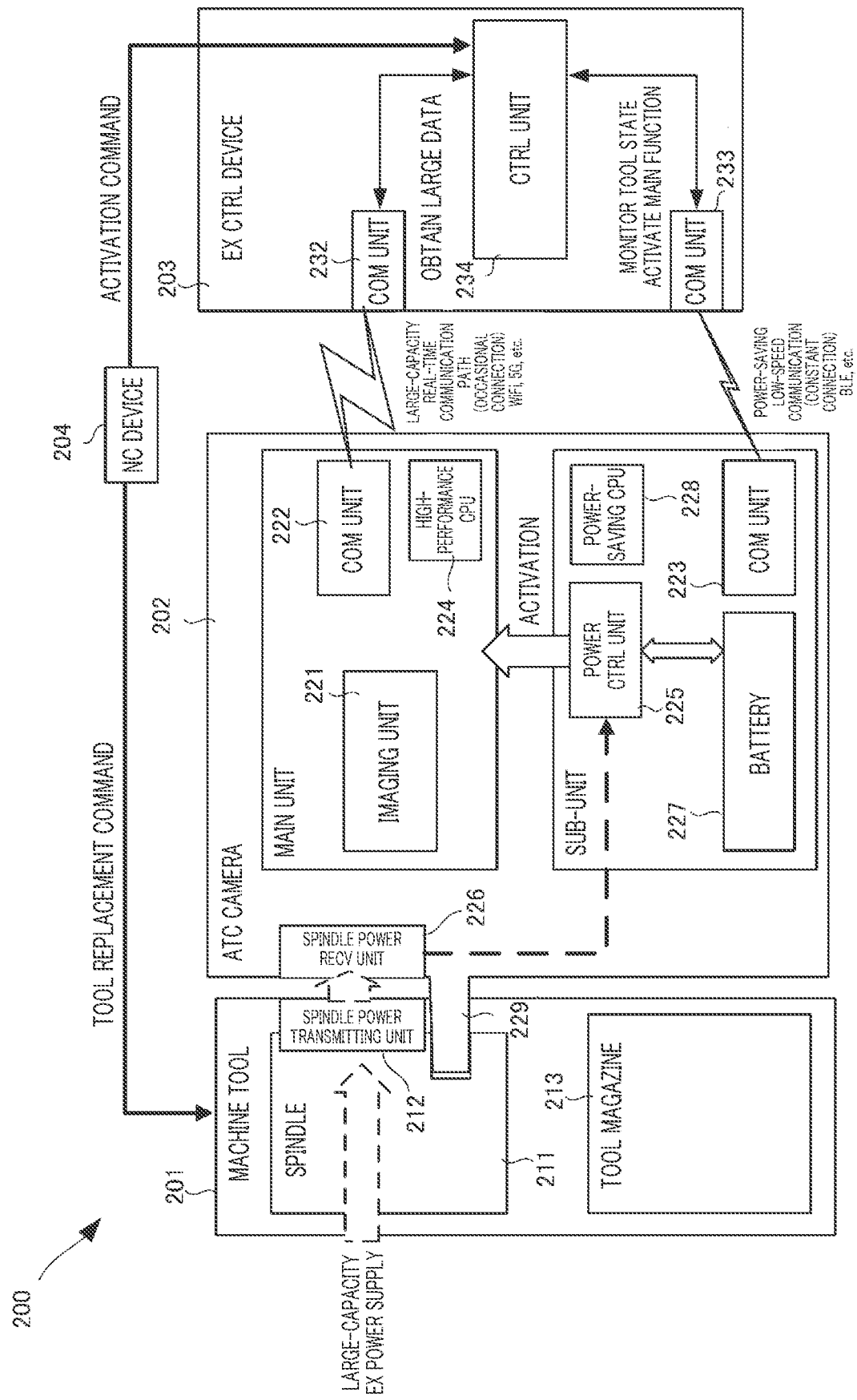
FIG. 2 is a block diagram illustrating a configuration of a machine tool system according to a second embodiment.

Next, a machine tool system 200 according to a second embodiment will be described with reference to FIG. 2 and subsequent drawings. FIG. 2 is a block diagram illustrating a functional configuration of the machine tool system 200.

As illustrated in FIG. 2, the machine tool system 200 includes a machine tool 201, an automatic tool changer (ATC) camera 202, which is an example of the device for a machine tool, an external control device 203, and a numerical control (NC) device 204.

The machine tool 201 includes actuators (such as a shaft driving actuator, a spindle driving actuator, a tool replacing actuator, a workpiece/pallet replacing actuator, a cooling mechanism actuator, and a chip conveying actuator), and sensors (such as a temperature sensor, a vibration sensor, a crash sensor, a light sensor, and a touch sensor), which are controlled by programs.

The NC device 204 includes a numerical controller (NC) and a programmable logic controller (PLC) therein. The PLC controls the actuators of the machine tool 201 on the basis of internal PLC control logic stored in PLC registers or the like and data or signals received from the sensors and the NC. The NC controls the actuators and the PLC on the basis of users' inputs, NC programs (machining programs) that are manually or automatically generated, and data or signals received from the sensors.

The machine tool 201 includes a spindle 211, which is an example of the tool attachment part, a spindle power transmitting unit 212 for supplying power from a large-capacity external power supply from the spindle 211 to the ATC camera 202, which is an example of the device for a machine tool, and a tool magazine 213. While the tool magazine 213 is presented as an example herein, a tool turret may alternatively be included.

The ATC camera 202, which is an example of the device for a machine tool, can be attached to and detached from the spindle 211 and the tool magazine 213 of the machine tool 201 via an attachment part 229. The ATC camera 202 includes, in a main unit, an imaging unit 221, which is a data generating unit, a communication unit 222, and a high-performance central control unit (CPU) 224, which is a control unit.

The ATC camera 202 also includes, in a sub-unit, a communication unit 223, a power control unit 225, a battery 227, and a power-saving CPU 228.

The ATC camera 202 further includes a spindle power receiving unit 226 for receiving power supply in an contactless manner (wireless power transfer) from the spindle power transmitting unit 212.

While the ATC camera is described as an example of the device for a machine tool herein, the device for a machine tool is not limited thereto. For example, a measurement device, a laser scanner, or an intelligent tool may be attached as a device for a machine tool. In the case of the ATC camera, for example, the imaging unit 221, which is a data generating unit, generates image data or video data. In a case of a measurement device, temperature data, vibration data, strain data, or the like are generated as measurement data. In a case of a laser scanner, scanning data are generated as measurement data. The intelligent tool is a sensor-equipped tool including a sensor for sensing machining resistance, vibration, temperature, or the like of the tool during machining of a workpiece. In this case, data detected by the sensor are generated.

The imaging unit 221 takes images of the inside the machine tool 201. The taken images are used for detecting the positions or the amounts of chips, for example.

The communication unit 222 transmits the image data generated by the imaging unit 221 to the external control device 203, which is an information processing device. The external control device 203 is a computer associated with the machine tool 201, for example. The external control device 203 includes communication units 232 and 233, and a control unit 234. The communication unit 223 and the communication unit 233 are constantly connected with each other in a power-saving and low-speed communication mode. In other words, the communication unit 223 constantly communicates with the external control device 203. For the power-saving and low-speed communication mode, at least any one communication standard among Bluetooth (registered trademark), Bluetooth Low Energy (registered trademark), UWB, Wi-SUN (Wireless Smart Utility Network), ANT, ZigBee, Sub-Ghz, Z-wave, Wireless HART, and EnOcean may be adopted. Power-saving radio communication in the 920 MHz band may be used. A communication method with a power consumption of 0.01 to 0.60 W or a peak current consumption of 20 mA or smaller is preferable. An example of such a communication method is a communication standard of Bluetooth Low Energy (registered trademark) with a power consumption of 0.01 to 0.50 W and a peak current consumption of 15 mA or smaller.

Upon receiving an activation command from the NC device 204, the intelligent tool control unit 234 instructs the power control unit 225 to activate the main unit via the communication unit 233 and the communication unit 223.

When the communication unit 223 has received an activation command from the external control device 203, the power control unit 225 supplies power from the battery 227 to the power control unit 225 to activate the main unit (that is, the high-performance CPU 224). The high-performance CPU 224 activates and controls the communication unit 222.

The battery 227 constantly supplies stored power to the communication unit 223.

The communication unit 222 performs large-capacity and real-time communication with the external control device. For the large-capacity and real-time communication, at least any one communication standard among the fourth generation mobile communication system (4G), the fifth generation mobile communication system (5G), WiFi, LTE (Long Term Evolution), Flash-OFDM, and iBurst may be used. Alternatively, the large-capacity real-time communication may be communication using a public communication network other than 4G and 5G.

The spindle power receiving unit 226 transmits power supplied from the spindle power transmitting unit 212 to the power control unit 225.

The spindle power receiving unit 226 receives power supply from the spindle power transmitting unit 212 mounted on the spindle 211 in a state in which the ATC camera 202 is attached to the spindle 211. The spindle power receiving unit 226 receives power supply from the spindle power transmitting unit 212 in a contactless manner. The spindle power receiving unit 226 receives contactless power supply from the spindle power transmitting unit 212 by at least any one system among an electromagnetic induction system, a magnetic field resonance system, a circular solenoid system, an evanescent wave system, a laser system, an electrolytic coupling system, and a microwave system. The spindle power receiving unit 226 may receive power supply from the spindle power transmitting unit 212 in accordance with the Qi (registered trademark) standard.

The communication unit 223 receives an activation command from the external control device 203 before the ATC camera 202 is attached to the spindle 211, and activates the main unit to establish communication between the communication unit 222 and the external control device 203 until the ATC camera 202 is attached to the spindle 211.

The battery 227 has a capacity that enables continuous communication via the communication unit 223 for at least a month, or preferably more than two months, in a state in which the ATC camera 202 is attached to a tool holder of the tool magazine 213 of the machine tool 201 and no power is supplied from outside.

While an example in which the external control device 203 is located outside the machine tool 201 is presented herein, the external control device 203 may be located inside the machine tool 201. Upon receiving an activation command from the NC device 204, the external control device 203 sends the activation command to the communication unit 223. At the same time as being activated, the main unit, that is, the high-performance CPU 224 activates the communication unit 222 and establishes communication.

The ATC camera 202 and the external control device 203 constitute an information processing system.

Figure 3:
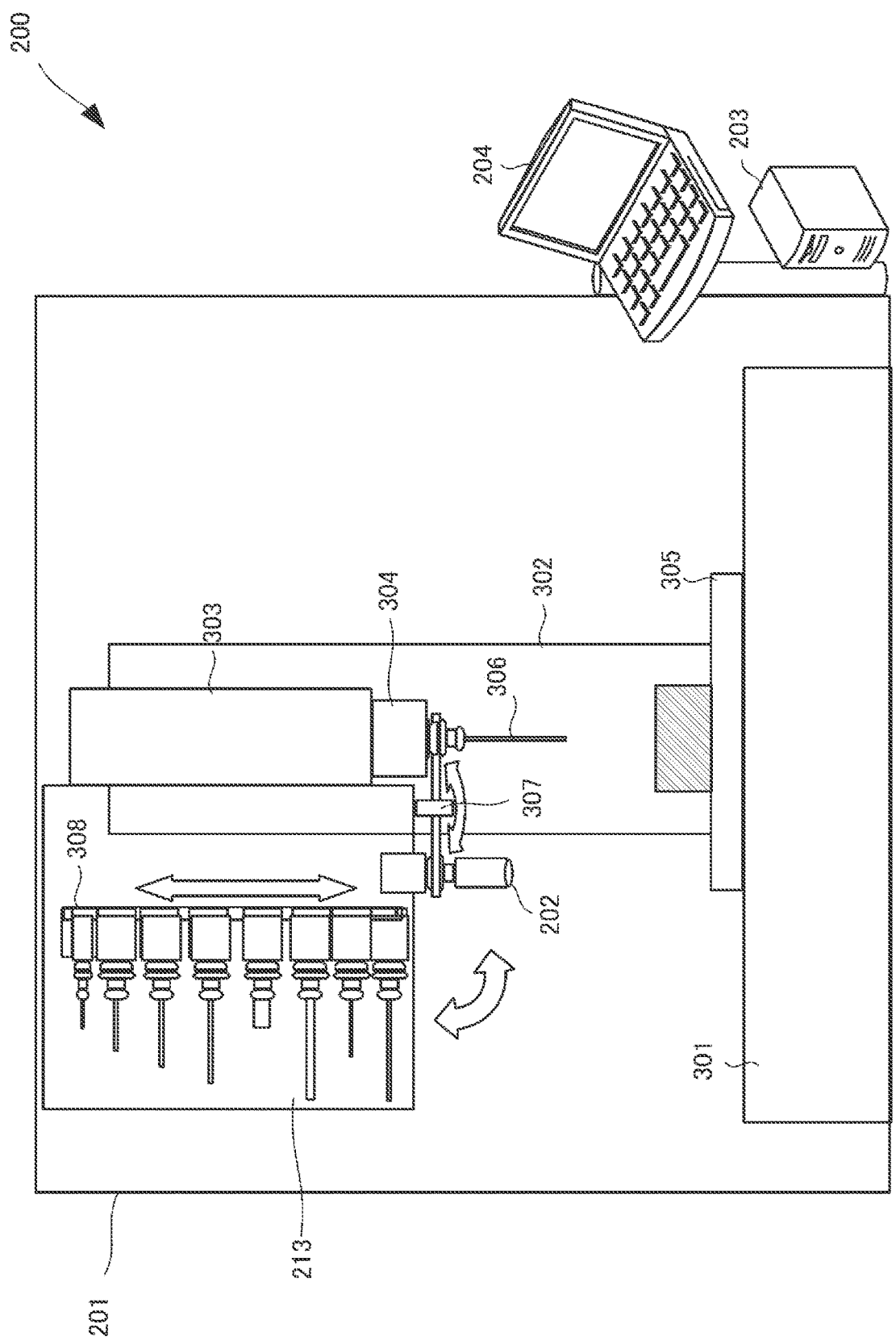
FIG. 3 is an external view of the machine tool system according to the second embodiment.

FIG. 3 is an external view of the machine tool system 200. While FIG. 3 illustrates an example of a case where the machine tool 201 is a vertical machining center, the machine tool 201 is not limited thereto. The machine tool 201 may be any machine tool that is numerically controlled by a numerical control device, such as a milling machine, a lathe, a turning/milling machine, a milling, turning machine, a turning center, a machining center, or a combined machine. Still alternatively, the machine tool may be an additive manufacturing device for additive manufacturing with metal powder.

The machine tool 201 includes a bed 301, a column 302 placed upright on the bed 301, and a spindle head 303 being supported by the column 302 and movable upward and downward. The machine tool 201 also includes a spindle 304 rotatably supported by the spindle head 303, a table 305 located on the bed 301 below the spindle 304, a spindle rotation drive mechanism for rotating the spindle 304, and the tool magazine 213 located lateral to the spindle head 303. The machine tool 201 includes a tool replacement arm 307 located at a lower end of the tool magazine 213 to replace a tool 306 attached to the spindle 304 and the ATC camera 202 stored in a tool storage part of the tool magazine 213.

An operation command is sent to a feed mechanism 308, which causes the spindle 304, together with the spindle head 303, to start moving, the tool replacement arm 307 is thus turned forward by 90° to hold the ACT camera 202 and the tool 306, and the tool replacement mechanism 307 is then turned backward by 180° to attach the ATC camera 202 to spindle 304 and hold the tool 306 with the tool storage part.

As described above, the machine tool 201 enables automatic tool replacement to attach the ATC camera 202 to the spindle 304 in accordance with an instruction from the NC device 204. In addition, in conjunction with the replacement, the external control device 203 can activate a large-capacity communication function in the ATC camera 202.

Figure 4:
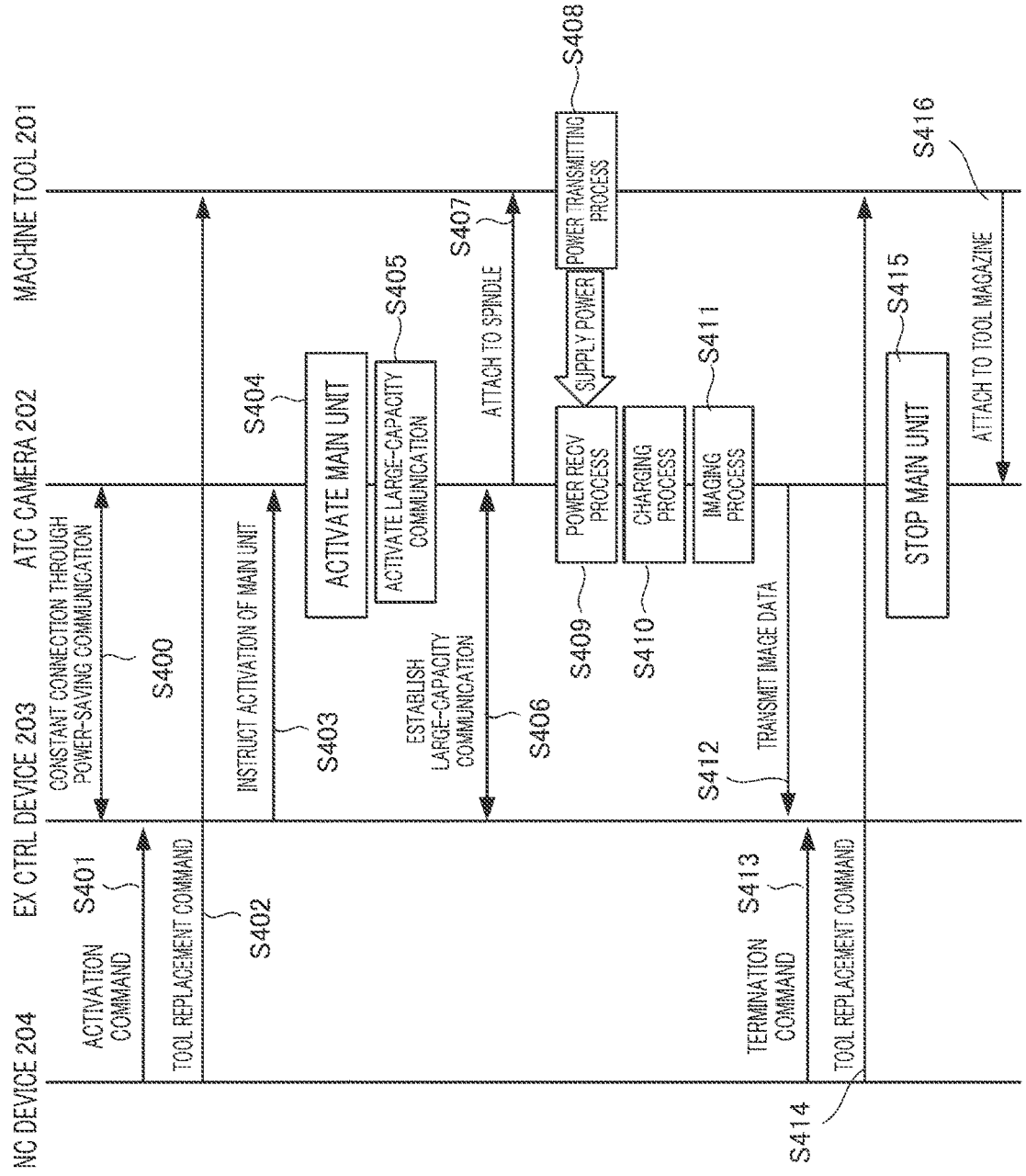
FIG. 4 is a sequence diagram illustrating a processing flow of the machine tool system according to the second embodiment.

FIG. 4 is a sequence diagram illustrating transmission and reception of signals to and from devices included in the machine tool system 200.

First, the ATC camera 202 in a sleep state, in which the ATC camera 202 is not attached to the spindle, and the external control device 203 are constantly connected with each other in the power-saving communication mode by the communication unit 223 (S400).

Subsequently, an activation command is transmitted from the NC device 204 to the external control device 203 (S401), and a tool replacement command is then transmitted from the NC device 204 to the machine tool 201 (S402).

Subsequently, triggered by reception of the activation command, the external control device 203 instructs the ATC camera 202 to activate the main unit (S403).

The ATC camera 202, upon receiving the instruction from the external control device 203, activates the main unit (S404). Upon receiving an "activation notification", the ATC camera 202 activates minimum functions for establishing large-capacity communication. At this stage, functions such as a camera and a sensor other than those for establishing the large-capacity communication are not activated (this is to save power because the operation is powered by the internal battery). In conjunction with the activation, in the ATC camera 202, the large-capacity communication mode such as WiFi used by the communication unit 222 is activated (S405 and S406).

The machine tool 201 attaches the ATC camera 202 in accordance with the tool replacement command from the NC device 204 (S407). The activation of the large-capacity communication functions is completed while the ATC camera 202 moves from an ATC area to a work area.

Furthermore, the machine tool 201 performs a power transmitting process on the ATC camera 202 (S408), and the ATC camera 202 performs a power receiving process (S409). The ATC camera 202 thus starts a process of charging the battery 227 (S410), and simultaneously activates functions that use power such as the imaging unit 221, and performs an imaging process (S411). Image data generated by the imaging process are transmitted to the external control device 203 through the large-capacity communication (S412).

When a next tool replacement command and a termination command from the NC device 204 are present (S413 and S414), the ATC camera 202 stops the main unit (S415), and the machine tool 201 attaches the ATC camera to the tool magazine.

Figure 5:
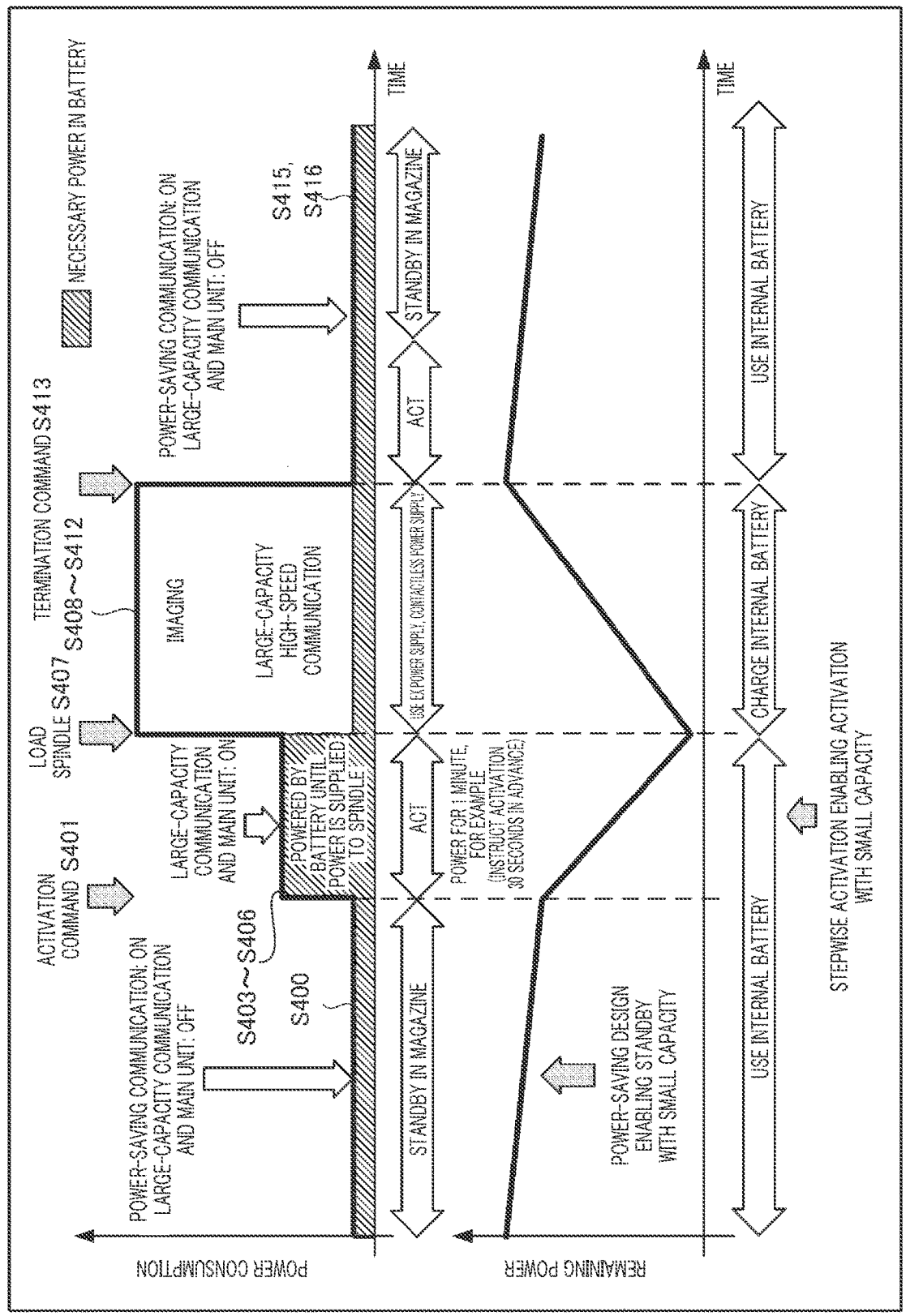
FIG. 5 is a timing chart illustrating changes in power consumption and remaining battery level of the machine tool system according to the second embodiment.

FIG. 5 is a timing chart illustrating changes in power consumption and remaining battery level along the time axis.

During step S400 in which the external control device 203 and the ATC camera 202 are constantly connected with each other in the power-saving communication mode by the communication unit 223, power consumption is small and the remaining battery level does not decrease significantly.

When the ATC camera 202 activates the main unit in response to the activation instruction from the external control device 203 and the large-capacity communication mode performed by the communication unit 222 is activated (S403 to S406), the power consumption increases and the remaining battery level decreases significantly. The battery capacity is set so that a sufficient remaining battery level can be obtained after the elapse of a maximum estimated standby time (S400) and until the ACT camera 202 is mounted on the spindle (S407) after activation of the large-capacity communication mode.

This reduces the power consumption while the battery is used, and enables an alert to be provided to the external control device before the battery is completely discharged. Furthermore, the ATC camera can be attached to the spindle only for the purpose of charging.

Intelligent devices such as the ATC camera 202 including the battery 227 are required to save power, and the use of the battery 227 is stopped while the ATC camera 202 is not used. Power is then supplied from around the spindle to operate the ATC camera 202. In this case, supply of power to the ATC camera 202 after being attached to the spindle 211 will result in a long activation time of a tool using radio transmission. If large-capacity communication is constantly established, however, an increase in the size of the battery 227 is inevitable in order to achieve a sufficient standby time, which makes the ATC camera 202 itself larger and more complicated.

The present embodiment therefore provides a spindle attachment device that is completely cableless and that is reduced in size while being sophisticated and having high performance as described above. In particular, the device has achieved a shorter time from attachment to the spindle until the device is ready to be used (which is ideally a 0-second activation time, that is, being already ready to use when moved close to a workpiece). Furthermore, a sufficient remaining battery level can be ensured even after the device is kept attached to the tool holder or magazine for several weeks or months. High performance refers to being capable of performing large-capacity and high-speed communication (such as transmission of images such as still images and videos, or transmission of measurement data requiring low delay). Furthermore, the spindle attachment device is capable of being continuously used without use of a charging mechanism in the magazine, an offline charging mechanism, or the like for charging the battery.

In the present embodiment, the device is constantly connected with the external control device by power-saving radio communication powered by the battery, receives an instruction via the power-saving radio communication immediately before the device is attached to the spindle, and activates the main unit and the large-capacity communication. As a result, the main system is activated before the device is mounted on the spindle.

Consequently, the battery can be reduced in size or capacity while "constant" and "large-capacity" communication is ensured. The battery is mounted on the tool, and a transmission path using radio transmission (power-saving communication) only for power-saving and minimal communication is provided in addition to a main transmission path (large-capacity communication) mainly for radio transmission in a state being attached to the spindle. The battery is used mainly for the power-saving communication. The battery is charged by contactless power supply in the state being attached to the spindle. Although the period in the state being attached to the spindle is short, the battery is small in size and charging thereof is thus completed in a short time.

Furthermore, information such as the battery capacity and the use history (time) can be obtained via the power-saving communication even in a state in which the device for a machine tool such as the ATC camera is not used. This enables a charging process (such as dummy replacement) using an unoccupied time of the external control device 203. As a result, the device for a machine tool can be prevented from running out of battery. Even when the battery has run out of power, the device for a machine tool can still be used, although the time from attachment to the spindle until the device for a machine tool becomes usable increases (capable of smart recovery). Thereafter, the charging is completed during use, and the activation time shortening mechanisms thus functions.

As described above, an excellent machine tool system can be built. High-capacity radio communication can be used immediately after attachment, which reduces the cycle time.

Other Embodiments

The present invention has been described above with reference to the embodiments. The present invention, however, is not limited to the embodiments. The configurations and details in the present invention can be modified in various manners that can be understood by those skilled in the art within the scope of the present invention. In addition, systems or devices including any combination of different features included in the individual embodiments fall within the technical scope of the present invention.

In addition, the present invention may be applied to a system constituted by a plurality of devices, or may be applied to a single device. Furthermore, the present invention is also applicable to cases where information processing programs implementing the functions in the embodiments are supplied to a system or a device and executed by an internal processor. Programs to be installed in a computer to implement the functions of the present invention on the computer, a medium storing the programs, a server allowing the programs to be downloaded, and a processor that executes the programs are also within the technical scope of the present invention. In particular, at least a non-transitory computer readable medium storing programs to cause a computer to perform the processing steps included in the embodiments described above is within the technical scope of the present invention.

What is claimed is:

1. A device for a machine tool, detachable from an attachment part of the machine tool, comprising:
   an imaging unit to generate image or video data;
   a first communication unit to transmit the data generated by the imaging unit to an information processing device;
   a first control unit to activate and control the first communication unit;
   a power receiving unit to receive power supplied from outside and transmit the power to the first control unit;
   a second communication unit capable of constantly communicating with the information processing device;
   a battery to supply power to the second communication unit; and
   a second control unit to supply power to the first control unit to activate the first control unit when the second communication unit has received an activation command from the information processing device
   wherein the second communication unit receives the activation command before the device for a machine tool is attached to the attachment part, and activates the first control unit to establish communication between the first communication unit and the information processing device before the device for a machine tool is attached to the attachment part.

2. The device for a machine tool according to claim 1, wherein
   the attachment part is a spindle of the machine tool,
   the battery constantly supplies power to the second communication unit, the first communication unit performs large-capacity real-time communication with the information processing device, and the second communication unit performs power-saving low-speed communication with the information processing device.

3. The device for a machine tool according to claim 1, wherein the first communication unit communicates by using at least any one communication standard among WiFi, LTE, Flash-OFDM, a fourth generation mobile communication system (4G), a fifth generation mobile communication system (5G), and iBurst, and the second communication unit communicates by using at least any one communication standard among Bluetooth (registered trademark), Bluetooth Low Energy (registered trademark), UWB, Wi-SUN (Wireless Smart Utility Network), ANT, ZigBee, Sub-GHz, Z-wave, Wireless HART, and EnOcean.

4. The device for a machine tool according to claim 1, wherein the power receiving unit receives power supply from a power transmitting unit located on the attachment part in a state in which the device for a machine tool is attached to the attachment part, the power receiving unit receives contactless power supply from the power transmitting unit, and the power receiving unit receives contactless power supply from the power transmitting unit by at least any one system among an electromagnetic induction system, a magnetic field resonance system, a circular solenoid system, an evanescent wave system, a laser system, an electrolytic coupling system, and a microwave system.

* * * * *